United States Patent
Yun et al.

(10) Patent No.: US 9,479,367 B2
(45) Date of Patent: Oct. 25, 2016

(54) APPARATUS AND METHOD FOR TRANSMITTING AND RECEIVING PREAMBLES IN A DIGITAL VIDEO BROADCASTING SYSTEM

(75) Inventors: Sung-Ryul Yun, Suwon-si (KR); Jae-Yoel Kim, Suwon-si (KR); Hwan-Joon Kwon, Suwon-si (KR); Yeon-Ju Lim, Seoul (KR); Hak-Ju Lee, Incheon (KR); Hong-Sil Jeong, Seoul (KR); Seho Myung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1540 days.

(21) Appl. No.: 12/361,734

(22) Filed: Jan. 29, 2009

(65) Prior Publication Data

US 2009/0190039 A1    Jul. 30, 2009

(30) Foreign Application Priority Data

| Jan. 29, 2008 | (KR) | 10-2008-0009295 |
| Jan. 31, 2008 | (KR) | 10-2008-0010415 |
| Feb. 29, 2008 | (KR) | 10-2008-0019388 |

(51) Int. Cl.
*H04B 1/10* (2006.01)
*H04L 25/03* (2006.01)
*H04L 27/26* (2006.01)

(52) U.S. Cl.
CPC ..... *H04L 25/03866* (2013.01); *H04L 27/2613* (2013.01); *H04L 27/2617* (2013.01); *H04L 27/2656* (2013.01); *H04L 27/2657* (2013.01)

(58) Field of Classification Search
CPC ............. H04L 1/0071; H04L 27/2614; H04L 25/03866

USPC .......................... 375/260, 295, 316
See application file for complete search history.

(56) References Cited

U.S. PATENT DOCUMENTS 6,134,225 A    10/2000    Pham et al.
6,389,000 B1    5/2002    Jou
(Continued)

FOREIGN PATENT DOCUMENTS

EP    1 463 256 A1    9/2004
EP    1 469 649 A1    10/2004
(Continued)

OTHER PUBLICATIONS

Digital Video Broadcasting, Frame structure channel coding and modulation for a second generation digital terrestrial television broadcasting system (DVB-T2), DVD Document A122r1, Jan. 2008.

(Continued)

*Primary Examiner* — David S Huang
(74) *Attorney, Agent, or Firm* — Jefferson IP Law, LLP (57) ABSTRACT

An apparatus and method for transmitting a preamble in a Digital Video Broadcasting (DVB) system are provided. The apparatus includes a first processor for generating a Modulation Signaling Sequence (MSS) using a plurality of received sequences, and for outputting a modulated sequence by differentially modulating the MSS. The apparatus also includes a scrambler for scrambling the modulated sequence by multiplying the modulated sequence by a scrambling sequence. A second processor receives the scrambled sequence through each allocated subcarrier, converts the received sequence into a time-domain signal, and generates and transmits the preamble.

11 Claims, 9 Drawing Sheets

(56) References Cited

U.S. PATENT DOCUMENTS

| | | | |
|---|---|---|---|
| 7,693,034 B2* | 4/2010 | Singh et al. | 370/208 |
| 8,340,216 B2* | 12/2012 | Schotten et al. | 375/316 |
| 2002/0172184 A1* | 11/2002 | Kim et al. | 370/344 |
| 2004/0128533 A1* | 7/2004 | Choi et al. | 713/200 |
| 2004/0252229 A1 | 12/2004 | Jiang et al. | |
| 2005/0047325 A1 | 3/2005 | Singh et al. | |
| 2005/0058089 A1 | 3/2005 | Vijayan et al. | |
| 2006/0184862 A1 | 8/2006 | Kim et al. | |
| 2006/0193245 A1* | 8/2006 | Aghvami et al. | 370/208 |
| 2007/0206638 A1 | 9/2007 | Santoru et al. | |
| 2007/0223364 A1* | 9/2007 | Terabe et al. | 370/208 |
| 2009/0003462 A1* | 1/2009 | Chen | 375/240.28 |
| 2010/0177847 A1* | 7/2010 | Woodward | 375/296 |
| 2012/0140843 A1* | 6/2012 | Sartori et al. | 375/295 |
| 2012/0195353 A1 | 8/2012 | Tzannes | |

FOREIGN PATENT DOCUMENTS

| | | |
|---|---|---|
| JP | 2000-68973 A | 3/2000 |
| JP | 2006-33236 A | 2/2006 |
| JP | 2007129755 A | 5/2007 |
| KR | 10-2005-0066990 A | 6/2005 |
| RU | 2 216 866 C2 | 11/2003 |
| RU | 2006 110 517 A | 10/2007 |
| WO | 2007037008 A1 | 4/2007 |

OTHER PUBLICATIONS

Digital Video Broadcasting (DVB); Framing structure, channel coding and modulation for digital terrestrial television, ETSI EN 300 744, V1.5.1, France, Jun. 2004.

BBC, Nokia, Teracom, DVB-T2 Concept, Presentation at TM-T2 meeting in Helsinki, Jun. 26, 2007, published on the DVB-T2 web-site.

Frame structure channel coding and modulation for a second generation digital terrestrial television broadcasting system, Jun. 2008, TM3980 Rev.5, pp. 102-107, DVB Document A122.

XP-002523675, Digtal Video Broadcasting, "Frame structure channel coding and modulation for a second generation digital terrstrial television broadcasting system" (DVB-T2), DVB Document A122r1, Jan. 2008.

* cited by examiner

APPARATUS AND METHOD FOR TRANSMITTING AND RECEIVING PREAMBLES IN A DIGITAL VIDEO BROADCASTING SYSTEM

PRIORITY

This application claims the benefit under 35 U.S.C. §119 (a) of a Korean Patent Application filed in the Korean Intellectual Property Office on Jan. 29, 2008 and assigned Serial No. 10-2008-0009295, a Korean Patent Application filed in the Korean Intellectual Property Office on Jan. 31, 2008 and assigned Serial No. 10-2008-0010415, and a Korean Patent Application filed in the Korean Intellectual Property Office on Feb. 29, 2008 and assigned Serial No. 10-2008-0019388, the entire disclosures of all of which are hereby incorporated by reference.

BACKGROUND OF THE INVENTION

1. Field of the Invention

The present invention relates generally to a Digital Video Broadcasting (DVB) system. More particularly, the present invention relates to an apparatus and method for transmitting and receiving preambles among components of a frame in a DVB system.

2. Description of the Related Art

Generally, the term "digital broadcasting system" denotes a broadcasting system using a digital transmission technology, such as Digital Audio Broadcasting (DAB), Digital Video Broadcasting (DVB) and Digital Multimedia Broadcasting (DMB).

Among others, the DVB system, a European digital broadcasting technology, is a transmission standard for supporting not only the existing digital broadcasting but also mobile/portable digital multimedia services.

The DVB system can multiplex Moving Picture Experts Group 2 Transport Stream (MPEG 2 TS)-based broadcast data, and transmit IP-based data streams simultaneously. In the DVB system, various services can be transmitted after being multiplexed to one IP stream. And, after receiving data of the transmitted IP stream, a terminal can demultiplex it back into individual services, demodulate the services, and output them through a screen of the user terminal. At this point, the user terminal needs information indicating types of the various services provided by the DVB system and the details that each of the services contains.

Figure 1:
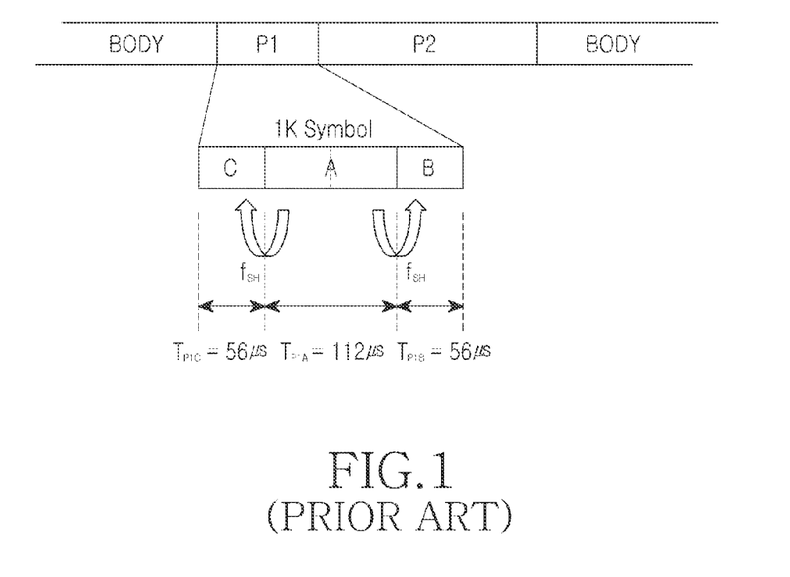
FIG. 1 is a diagram illustrating a frame structure of a physical channel in a conventional DVB system according to prior art.

FIG. 1 is a diagram illustrating a frame structure of a physical channel in a DVB system according to prior art.

Referring to FIG. 1, the frame structure can be roughly divided into preamble parts P1 and P2, and body parts BODY. The preamble parts P1 and P2 are used for transmitting signaling information of the frame, while the body parts consist of the parts used for transmitting data or payload.

The purposes of the preamble P1 in FIG. 1 are as follows. First, the preamble P1 is used for scanning an initial signal of a frame at a receiver. Second, the preamble P1 is used for detecting a frequency offset and tuning the center frequency at the receiver. Third, the preamble P1 is used for transmitting identification information of the frame as well as transmitting Fast Fourier Transform (FFT) size and other transmission information. Finally, the preamble P1 is used for detecting and correcting frequency and time synchronization at the receiver.

Regarding the structure of the preamble P1 in FIG. 1, a part A, in which information is transmitted, is fixed to 1K Orthogonal Frequency Division Multiplexing (OFDM) symbols regardless of an FFT size of a payload where data is transmitted, and has a length of 112 μs. When the other parts B and C each consist of a ½ guard interval, they are added to both sides of the 1K symbols, with a length of 56 μs. As shown in FIG. 1, the total length of the preamble P1 is 224 μs.

Figure 2:
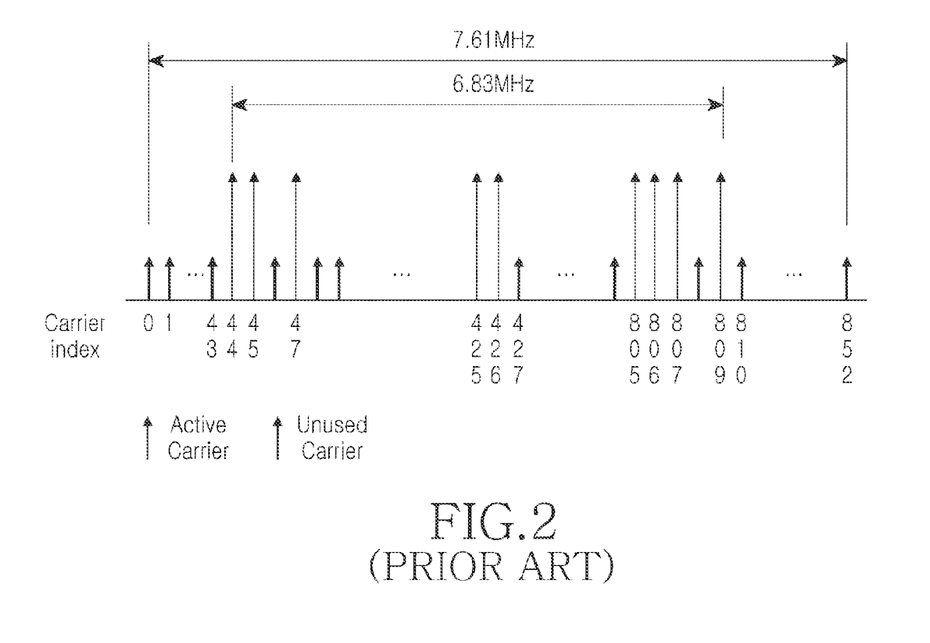
FIG. 2 is a diagram illustrating locations of carriers on which a preamble sequence is transmitted in the prior art.

FIG. 2 is a diagram illustrating locations of carriers on which a preamble sequence is transmitted in the prior art.

The drawing of FIG. 2 is given for a description of an internal structure of the 1K OFDM symbols shown in FIG. 1. As illustrated in FIG. 2, the 1K OFDM symbols include 853 carriers. Among the 853 carriers constituting the 1K OFDM symbols, only 384 carriers are used for transmission of a preamble sequence.

Figure 3:
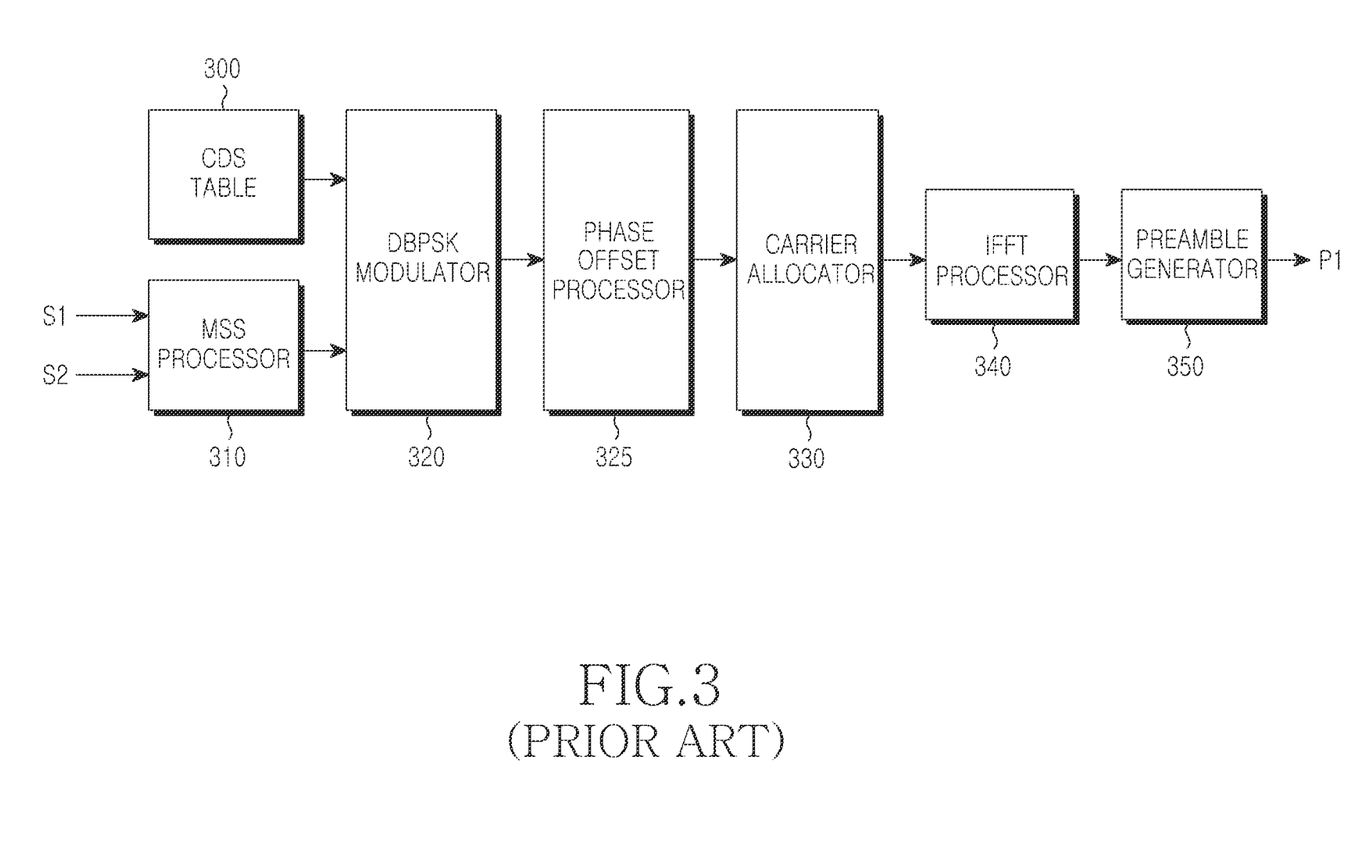
FIG. 3 is a block diagram illustrating a transmitter for transmitting a preamble in a DVB system according to prior art.

FIG. 3 is a block diagram illustrating a transmitter for transmitting a preamble in a DVB system according to prior art.

Locations of the carriers used for transmission of a preamble sequence among the 853 carriers can be predetermined. In FIG. 3, carrier locations are predetermined and stored in a Carrier Distribution Sequence (CDS) table 300.

An operation of a Modulation Signaling Sequence (MSS) processor 310 is as follows. The MSS processor 310 receives a first sequence (hereinafter 'S1') and a second sequence (hereinafter 'S2') and generates Complementary Sets of Sequences (CSSs). The S1 and S2 include 3-bit information and 4-bit information, respectively. The CSSs generated by the S1 and S2 have 8 and 16 combinations, respectively and $CSS_{S1}$ and $CSS_{S2}$ generated by the S1 and S2 have a length of 64 and 256, respectively. Such CSSs are characterized in that they are low in a Peak-to-Average Power Ratio (PAPR) and orthogonal with each other.

Signals of the S1 and S2 can be expressed as shown in Table 1, where they are expressed in hexadecimal.

TABLE 1

| Field | Val | Sequence (Hexadecimal notation) |
|---|---|---|
| S1 | 000 | 124721741D482E7B |
|  | 001 | 47127421481D7B2E |
|  | 010 | 217412472E7B1D48 |
|  | 011 | 742147127B2E481D |
|  | 100 | 1D482E7B12472174 |
|  | 101 | 481D7B2E47127421 |
|  | 110 | 2E7B1D4821741247 |
|  | 111 | 7B2E481D74214712 |
| S2 | 0000 | 121D4748212E747B1D1248472E217B7412E247B721D174841DED48B82EDE7B8B |
|  | 0001 | 4748121D747B212E48471D127B742E2147B712E2748421D148B81DED7B8B2EDE |
|  | 0010 | 212E747B121D47482E217B741D12484721D1748412E247B72EDE7B8B1DED48B8 |
|  | 0011 | 747B212E4748121D7B742E2148471D12748471D147B712E27B8B2EDE48B81DED |
|  | 0100 | 1D1248472E217B74121D4748212E747B1DED48B82EDE7B8B12E247B721D17484 |

TABLE 1-continued

| Field Val | Sequence (Hexadecimal notation) |
|---|---|
| 0101 | 48471D127B742E214748121D747B212E48B81DED7B8B2EDE47B712E2748421D1 |
| 0110 | 2E217B741D124847212E747B121D47482EDE7B8B1DED48B821D1748412E247B7 |
| 0111 | 7B742E2148471D12747B212E4748121D7B8B2EDE48B81DED748421D147B712E2 |
| 1000 | 12E247B721D174841DED48B82EDE7B8B121D4748212E747B1D1248472E217B74 |
| 1001 | 47B712E2748421D148B81DED7B8B2EDE4748121D747B212E48471D127B742E21 |
| 1010 | 21D1748412E247B72EDE7B8B1DED48B8212E747B121D47482E217B741D124847 |
| 1011 | 748421D147B712E27B8B2EDE48B81DED747B212E4748121D7B742E2148471D12 |
| 1100 | 1DED48B82EDE7B8B12E247B721D174841D1248472E217B74121D4748212E747B |
| 1101 | 48B81DED7B8B2EDE47B712E2748421D148471D127B742E214748121D747B212E |
| 1110 | 2EDE7B8B1DED48B821D1748412E247B72E217B741D124847212E747B121D4748 |
| 1111 | 7B8B2EDE48B81DED748421D147B712E27B742E2148471D12747B212E4748121D |

A series of processes in which the sequences S1 and S2 are output as a modulated sequence by means of the MSS processor 310 through a phase offset processor 325 is as follows.

Equation (1) represents a sequence generated by a combination of S1 and S2 in the MSS processor 310, and the sequence is denoted by MSS_SEQ.

$$\text{MSS\_SEQ} = \{CSS_{S1}, CSS_{S2}, CSS_{S1}\} \quad (1)$$

MSS_SEQ in Equation (1) is modulated by Differential BPSK (DBPSK) in a DBPSK modulator (or DBPSK mapper) 320. Equation (2) represents the DBPSK-modulated sequence, which is denoted by MSS_DIFF.

$$\text{MSS\_DIFF} = \text{DBPSK}(\text{MSS\_SEQ}) \quad (2)$$

The phase offset processor 325 outputs the finally modulated sequence by applying a 180° phase offset to 64 Most Significant Bit (MSB) bits (or cells) in the modulated sequence. The phase offset processor 325 does not apply the phase offset to the remaining bits except for the 64 MSB bits. Since the 64 MSB bits all have the same offset value, the phase offset value will not affect a demodulation process of a DBPSK demodulator in a receiver. Hence, there is no need for a reverse process of the phase offset process at the receiver. Finally, an output of the phase offset processor 325 is defined as Equation (3).

$$\text{MSS} = \{-\text{MSS\_DIFF}_{383, 382, \ldots, 320}, \text{MSS\_DIFF}_{319, 318, \ldots, 0}\} \quad (3)$$

The sequence being output through the MSS processor 310, DBPSK modulator 320 and phase offset processor 325, i.e. the modulated sequence, is allocated to 384 active carriers for P1 by the carrier allocator 330.

In structure, 2 guard intervals are added to improve robustness of symbols for P1, and operations of an Inverse Fast Fourier Transform (IFFT) processor 340 and a preamble generator 350 are substantially the same as that in FIG. 1.

Figure 4:
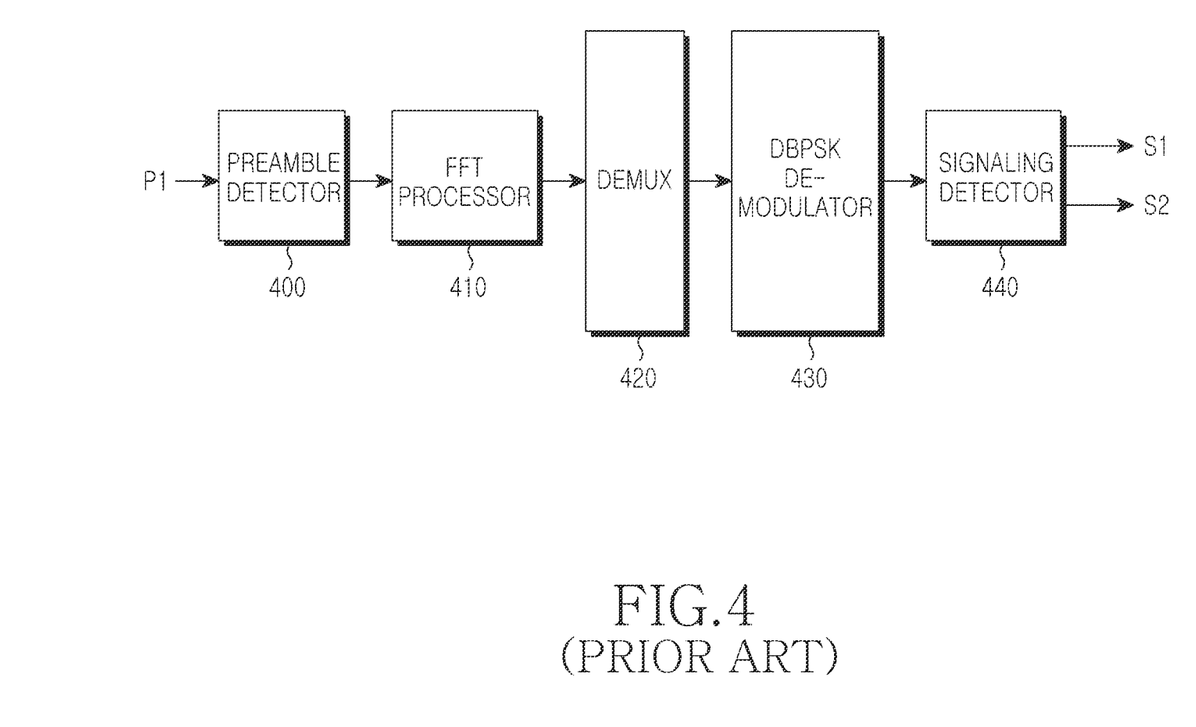
FIG. 4 is a block diagram illustrating a receiver for receiving a preamble in a DVB system according to prior art.

FIG. 4 is a block diagram illustrating a receiver for receiving a preamble in a DVB system according to prior art.

Referring to FIG. 4, a preamble detector 400 in the receiver detects a preamble and inputs it to an FFT processor 410. The FFT processor 410 performs FFT on the detected preamble and outputs the results to a demultiplexer (DEMUX) 420. Next, the DEMUX 420 demultiplexes data on active carriers through which a preamble is transmitted, and outputs the demultiplexed data to a DBPSK demodulator 430. The DBPSK demodulator 430 performs a reverse process of the phase offset processor 325, i.e. performs DBPSK demodulation that inversely phase-shifts MSB signals of the preamble by a length of 64 at the receiver, and then outputs the results to a signaling detector 440. The signaling detector 440 outputs desired information by detecting S1 and S2 from the demodulated sequence.

Figure 5:
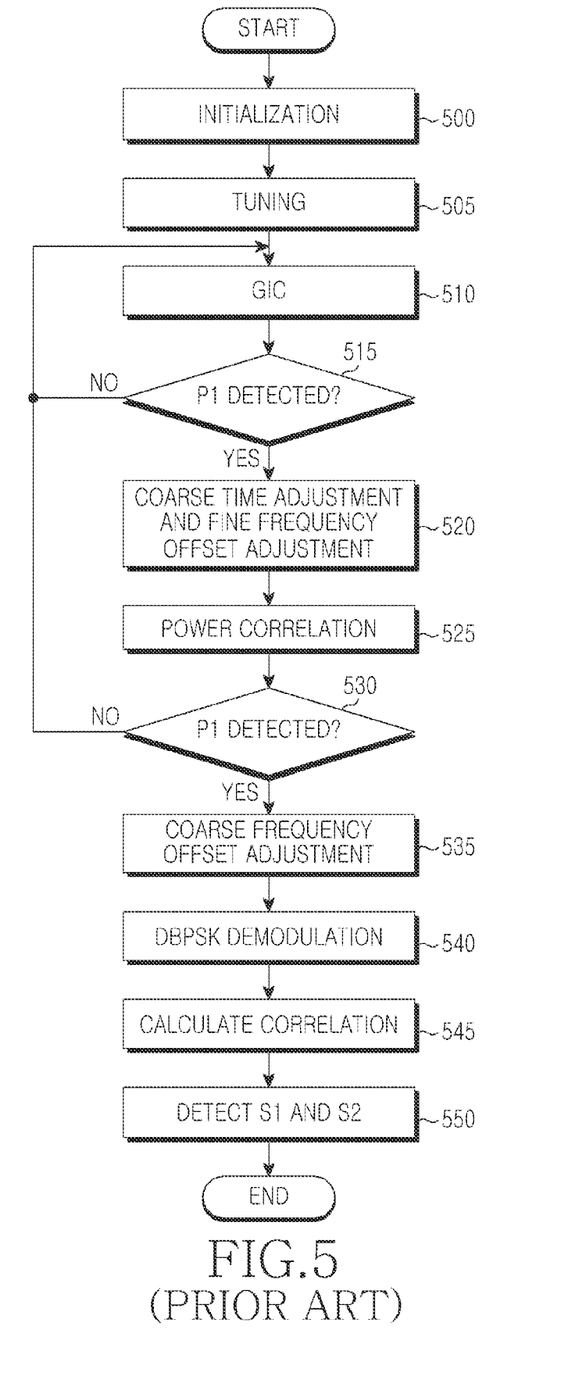
FIG. 5 is a flowchart illustrating a reception method for receiving a preamble in a DVB system according to prior art.

FIG. 5 is a flowchart illustrating a reception method for receiving a preamble in a DVB system according to prior art.

Referring to FIG. 5, the receiver performs initialization in step 500, and performs tuning on a preamble in step 505. The receiver performs Guard Interval-Correlation (GIC) on a received signal in step 510, and determines in step 515 whether it has detected a preamble P1. When the receiver has failed to detect the preamble P1 in step 515, the receiver returns to step 510. Otherwise, when the receiver has detected the preamble P1, the receiver performs coarse time adjustment and fine frequency offset adjustment in step 520. Next, in step 525, the receiver performs power correlation to estimate power of active carriers, and determines again in step 530 whether it has detected the preamble P1. Upon failure to detect the preamble P1, the receiver returns back to step 510, and when the receiver successfully detects the preamble P1, the receiver performs coarse frequency offset adjustment in step 535. Thereafter, the receiver performs DBPSK demodulation, which is a reverse process of the differential modulation scheme at the transmitter, in step 540, calculates a correlation value between preambles in step 545, and detects signals of S1 and S2 in step 550.

As the above-stated conventional preamble structure uses the differential modulation (i.e. DBPSK), non-coherent reception is possible. However, a characteristic of the complementary sequences changes due to the execution of the differential modulation, causing an increase in the PAPR. Accordingly, there is a need for an improved apparatus and method for transmitting and receiving preambles among components of a frame in a DVB system.

SUMMARY OF THE INVENTION

An aspect of the present invention is to address at least the above-mentioned problems and/or disadvantages and to provide at least the advantages described below. Accordingly, an aspect of the present invention is to provide an apparatus and method capable of reducing a PAPR of a preamble by scrambling.

In accordance with an aspect of the present invention, an apparatus for transmitting a preamble in a Digital Video Broadcasting (DVB) system is provided. The transmission apparatus includes a first processor for generating a Modulation Signaling Sequence (MSS) using a plurality of received sequences, and for outputting a modulated sequence by differentially modulating the MSS, a scrambler for scrambling the modulated sequence by multiplying the modulated sequence by a scrambling sequence and a second processor for receiving the scrambled sequence through each of a plurality of allocated subcarriers, for converting the received sequence into a time-domain signal, and for generating and transmitting the preamble.

In accordance with another aspect of the present invention, a method for transmitting a preamble in a Digital Video Broadcasting (DVB) system is provided. The transmission method includes generating a Modulation Signaling Sequence (MSS) using a plurality of received sequences, outputting a modulated sequence by differentially modulating the MSS, scrambling the modulated sequence by multiplying the modulated sequence by a scrambling sequence, receiving the scrambled sequence through each of a plurality of allocated subcarriers, converting the received sequence into a time-domain signal, and generating and transmitting the preamble.

In accordance with still another aspect of the present invention, an apparatus for receiving a preamble in a Digital Video Broadcasting (DVB) system is provided. The reception apparatus includes a first processor for detecting a preamble from a received signal, for converting the detected preamble into a frequency-domain signal, and for demultiplexing the frequency-domain signal, a descrambler for descrambling the demultiplexed sequence by multiplying the demultiplexed sequence by a descrambling sequence and a second processor for differentially demodulating the descrambled sequence and for detecting a plurality of sequences from the demodulated sequence.

In accordance with yet another aspect of the present invention, a method for receiving a preamble in a Digital Video Broadcasting (DVB) system is provided. The reception method includes detecting a preamble from a received signal, converting the detected preamble into a frequency-domain signal, demultiplexing the frequency-domain signal, descrambling the demultiplexed sequence by multiplying the demultiplexed sequence by a descrambling sequence, differentially demodulating the descrambled sequence and detecting a plurality of sequences from the demodulated sequence.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following description taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The present invention relates to a preamble where signaling information is transmitted, and in particular, to a preamble P1 through which initial information is transmitted. Exemplary embodiments of the present invention provide a method for addressing the above-stated problem that a Peak-to-Average Power Ratio (PAPR) of complementary sequences for a preamble increases due to the use of the differential modulation.

A description of exemplary embodiments of the present invention will now be given below.

Table 2 shows the PAPRs of preambles for a case in which the differential modulation scheme is not applied in the preamble P1. When 128 preamble signals are generated by combinations of S1 and S2, the maximum PAPR is 10.29 dB, the minimum PAPR is 6.72 dB, and an average PAPR is 8.21 dB.

TABLE 2

| S1 | S2 | PAPR |
|---|---|---|
| 0 | 0 | 8.05 |
| 0 | 1 | 7.76 |
| 0 | 2 | 8.38 |
| 0 | 3 | 8.84 |
| 0 | 4 | 7.93 |
| 0 | 5 | 8.45 |
| 0 | 6 | 8.60 |
| 0 | 7 | 7.41 |
| 0 | 8 | 7.42 |
| 0 | 9 | 8.55 |
| 0 | 10 | 8.58 |
| 0 | 11 | 9.44 |
| 0 | 12 | 8.87 |
| 0 | 13 | 8.87 |
| 0 | 14 | 6.87 |
| 0 | 15 | 7.58 |
| 1 | 0 | 8.48 |
| 1 | 1 | 8.19 |
| 1 | 2 | 9.61 |
| 1 | 3 | 6.78 |
| 1 | 4 | 7.94 |
| 1 | 5 | 7.96 |
| 1 | 6 | 8.61 |
| 1 | 7 | 8.43 |
| 1 | 8 | 7.54 |
| 1 | 9 | 9.21 |
| 1 | 10 | 7.63 |
| 1 | 11 | 7.94 |
| 1 | 12 | 9.22 |
| 1 | 13 | 8.82 |
| 1 | 14 | 8.26 |
| 1 | 15 | 7.09 |
| 2 | 0 | 6.72 |
| 2 | 1 | 8.94 |
| 2 | 2 | 9.20 |
| 2 | 3 | 8.88 |
| 2 | 4 | 8.60 |
| 2 | 5 | 8.00 |
| 2 | 6 | 8.07 |
| 2 | 7 | 8.81 |
| 2 | 8 | 7.06 |
| 2 | 9 | 8.24 |
| 2 | 10 | 7.35 |
| 2 | 11 | 8.16 |
| 2 | 12 | 7.83 |
| 2 | 13 | 6.86 |
| 2 | 14 | 8.79 |
| 2 | 15 | 7.65 |
| 3 | 0 | 8.32 |
| 3 | 1 | 8.60 |
| 3 | 2 | 7.90 |
| 3 | 3 | 7.38 |
| 3 | 4 | 9.02 |
| 3 | 5 | 6.73 |
| 3 | 6 | 8.05 |
| 3 | 7 | 6.98 |
| 3 | 8 | 8.05 |
| 3 | 9 | 7.63 |
| 3 | 10 | 7.37 |
| 3 | 11 | 8.55 |
| 3 | 12 | 7.28 |
| 3 | 13 | 7.48 |
| 3 | 14 | 7.56 |
| 3 | 15 | 8.87 |
| 4 | 0 | 8.52 |
| 4 | 1 | 8.62 |
| 4 | 2 | 9.11 |
| 4 | 3 | 8.77 |
| 4 | 4 | 7.18 |
| 4 | 5 | 10.22 |
| 4 | 6 | 8.16 |
| 4 | 7 | 7.42 |
| 4 | 8 | 8.32 |
| 4 | 9 | 8.49 |
| 4 | 10 | 7.56 |
| 4 | 11 | 8.60 |
| 4 | 12 | 8.64 |
| 4 | 13 | 7.62 |
| 4 | 14 | 8.34 |
| 4 | 15 | 9.72 |
| 5 | 0 | 8.85 |
| 5 | 1 | 9.23 |
| 5 | 2 | 7.39 |
| 5 | 3 | 7.54 |
| 5 | 4 | 9.27 |
| 5 | 5 | 10.07 |
| 5 | 6 | 8.11 |
| 5 | 7 | 7.90 |
| 5 | 8 | 8.74 |
| 5 | 9 | 10.29 |
| 5 | 10 | 7.99 |
| 5 | 11 | 7.91 |
| 5 | 12 | 8.64 |
| 5 | 13 | 8.68 |
| 5 | 14 | 7.76 |
| 5 | 15 | 8.48 |
| 7 | 0 | 7.87 |
| 7 | 1 | 8.78 |
| 7 | 2 | 8.62 |
| 7 | 3 | 7.52 |
| 7 | 4 | 8.67 |
| 7 | 5 | 8.65 |
| 7 | 6 | 8.16 |
| 7 | 7 | 7.61 |
| 7 | 8 | 7.26 |
| 7 | 9 | 7.68 |
| 7 | 10 | 7.49 |
| 7 | 11 | 8.64 |
| 7 | 12 | 7.54 |
| 7 | 13 | 8.01 |
| 7 | 14 | 7.98 |
| 7 | 15 | 7.04 |
| 8 | 0 | 8.49 |
| 8 | 1 | 8.15 |
| 8 | 2 | 7.09 |
| 8 | 3 | 7.27 |
| 8 | 4 | 7.27 |
| 8 | 5 | 7.14 |
| 8 | 6 | 7.22 |
| 8 | 7 | 6.99 |
| 8 | 8 | 7.47 |
| 8 | 9 | 8.72 |
| 8 | 10 | 7.92 |
| 8 | 11 | 7.66 |
| 8 | 12 | 9.32 |
| 8 | 13 | 8.13 |
| 8 | 14 | 7.72 |
| 8 | 15 | 8.48 |

However, Table 3 shows the PAPRs of preambles for a case in which the differential modulation scheme is applied. In this case, the maximum PAPR of the preambles is 10.50 dB, the minimum PAPR is 7.14 dB, and an average PAPR is 7.14 dB. As stated above, it can be seen from a comparison between Table 2 and Table 3 that the PAPR increases as characteristics of the complementary sequences are discrepant from each other due to the use of the differential modulation scheme. From Table 2 and Table 3, it can be appreciated that the average PAPR increases by 0.42 dB due to an influence of the differential modulation.

TABLE 3

| S1 | S2 | PAPR |
|---|---|---|
| 0 | 0 | 8.34 |
| 0 | 1 | 9.17 |
| 0 | 2 | 7.96 |
| 0 | 3 | 9.36 |
| 0 | 4 | 10.15 |
| 0 | 5 | 9.68 |
| 0 | 6 | 8.59 |

TABLE 3-continued

| S1 | S2 | PAPR |
|---|---|---|
| 0 | 7 | 9.33 |
| 0 | 8 | 8.85 |
| 0 | 9 | 8.83 |
| 0 | 10 | 8.53 |
| 0 | 11 | 7.70 |
| 0 | 12 | 9.21 |
| 0 | 13 | 7.64 |
| 0 | 14 | 7.99 |
| 0 | 15 | 7.81 |
| 1 | 0 | 8.93 |
| 1 | 1 | 10.21 |
| 1 | 2 | 8.42 |
| 1 | 3 | 10.50 |
| 1 | 4 | 9.36 |
| 1 | 5 | 10.41 |
| 1 | 6 | 9.25 |
| 1 | 7 | 8.92 |
| 1 | 8 | 9.48 |
| 1 | 9 | 9.20 |
| 1 | 10 | 8.36 |
| 1 | 11 | 9.28 |
| 1 | 12 | 9.79 |
| 1 | 13 | 9.59 |
| 1 | 14 | 8.00 |
| 1 | 15 | 9.58 |
| 2 | 0 | 8.56 |
| 2 | 1 | 9.69 |
| 2 | 2 | 9.65 |
| 2 | 3 | 10.04 |
| 2 | 4 | 8.89 |
| 2 | 5 | 9.84 |
| 2 | 6 | 8.72 |
| 2 | 7 | 8.66 |
| 2 | 8 | 8.90 |
| 2 | 9 | 9.30 |
| 2 | 10 | 8.14 |
| 2 | 11 | 7.89 |
| 2 | 12 | 9.31 |
| 2 | 13 | 8.92 |
| 2 | 14 | 8.81 |
| 2 | 15 | 8.89 |
| 3 | 0 | 8.81 |
| 3 | 1 | 9.50 |
| 3 | 2 | 8.18 |
| 3 | 3 | 9.16 |
| 3 | 4 | 10.45 |
| 3 | 5 | 9.57 |
| 3 | 6 | 9.32 |
| 3 | 7 | 9.82 |
| 3 | 8 | 9.50 |
| 3 | 9 | 7.96 |
| 3 | 10 | 8.64 |
| 3 | 11 | 7.14 |
| 3 | 12 | 9.76 |
| 3 | 13 | 7.98 |
| 3 | 14 | 8.18 |
| 3 | 15 | 8.32 |
| 4 | 0 | 7.68 |
| 4 | 1 | 8.10 |
| 4 | 2 | 8.41 |
| 4 | 3 | 9.10 |
| 4 | 4 | 8.41 |
| 4 | 5 | 9.16 |
| 4 | 6 | 8.65 |
| 4 | 7 | 9.29 |
| 4 | 8 | 9.40 |
| 4 | 9 | 7.59 |
| 4 | 10 | 8.87 |
| 4 | 11 | 8.48 |
| 4 | 12 | 8.38 |
| 4 | 13 | 8.48 |
| 4 | 14 | 7.55 |
| 4 | 15 | 8.32 |
| 5 | 0 | 8.31 |
| 5 | 1 | 9.12 |
| 5 | 2 | 8.33 |
| 5 | 3 | 9.44 |
| 5 | 4 | 8.79 |
| 5 | 5 | 9.36 |
| 5 | 6 | 8.24 |
| 5 | 7 | 8.84 |
| 5 | 8 | 8.38 |
| 5 | 9 | 8.00 |
| 5 | 10 | 8.23 |
| 5 | 11 | 10.39 |
| 5 | 12 | 8.70 |
| 5 | 13 | 8.44 |
| 5 | 14 | 8.15 |
| 5 | 15 | 8.44 |
| 7 | 0 | 7.54 |
| 7 | 1 | 8.51 |
| 7 | 2 | 8.87 |
| 7 | 3 | 8.92 |
| 7 | 4 | 8.16 |
| 7 | 5 | 8.70 |
| 7 | 6 | 8.85 |
| 7 | 7 | 8.25 |
| 7 | 8 | 7.69 |
| 7 | 9 | 7.65 |
| 7 | 10 | 9.14 |
| 7 | 11 | 9.27 |
| 7 | 12 | 8.14 |
| 7 | 13 | 7.64 |
| 7 | 14 | 8.53 |
| 7 | 15 | 7.96 |
| 8 | 0 | 7.52 |
| 8 | 1 | 7.75 |
| 8 | 2 | 8.48 |
| 8 | 3 | 8.85 |
| 8 | 4 | 8.83 |
| 8 | 5 | 8.70 |
| 8 | 6 | 7.47 |
| 8 | 7 | 8.69 |
| 8 | 8 | 8.75 |
| 8 | 9 | 7.19 |
| 8 | 10 | 8.88 |
| 8 | 11 | 8.57 |
| 8 | 12 | 8.81 |
| 8 | 13 | 7.67 |
| 8 | 14 | 7.32 |
| 8 | 15 | 8.94 |

As a method for addressing the problem of increasing PAPR caused by the differential modulation, i.e. for PAPR reduction, the DVB system can apply scrambling.

Figure 6:
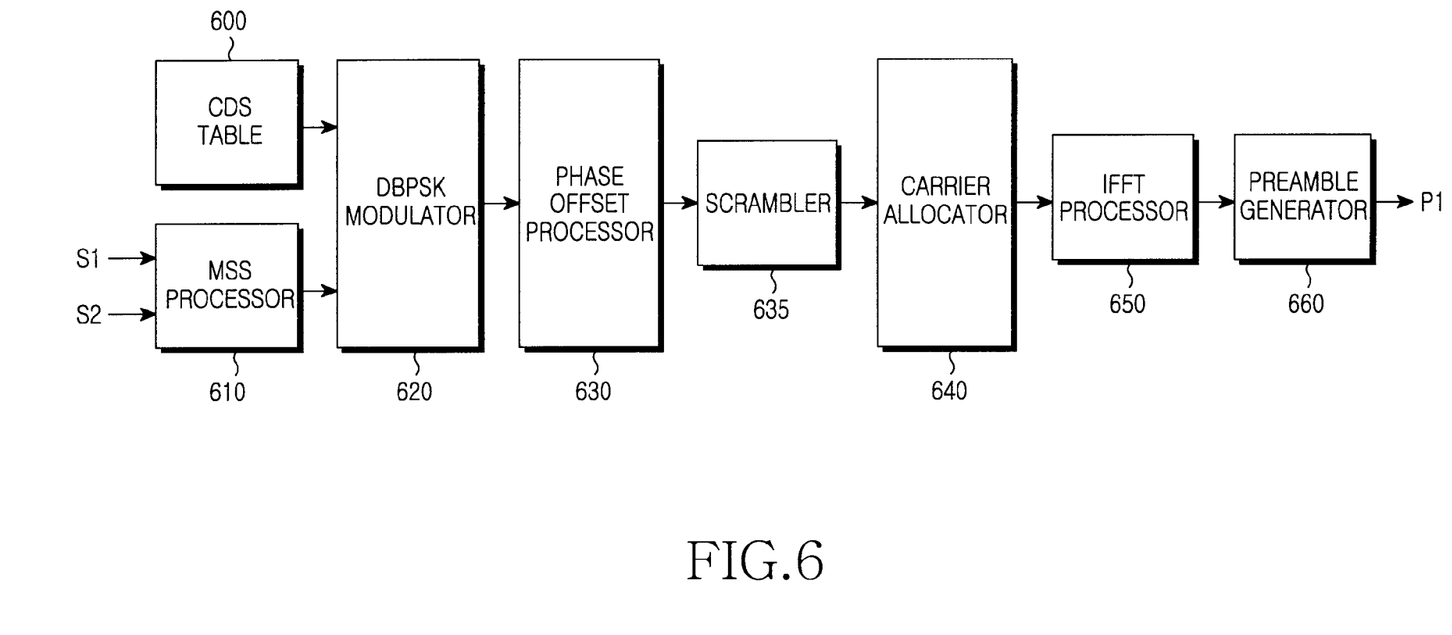
FIG. 6 is a block diagram illustrating a transmitter for transmitting a preamble in a DVB system according to an exemplary embodiment of the present invention.

FIG. 6 is a block diagram illustrating a transmitter for transmitting a preamble in a DVB system according to an exemplary embodiment of the present invention.

Referring to FIG. 6, the transmitter includes a CDS table 600, an MSS processor 610, a DBPSK modulator 620, a phase offset processor 630, a scrambler 635, a carrier allocator 640, an IFFT processor 650, and a preamble generator 660. Since the CDS table 600, the MSS processor 610, the DBPSK modulator 620, the phase offset processor 630, the carrier allocator 640, the IFFT processor 650 and the preamble generator 660 are substantially equal in operation to the CDS table 300, the MSS processor 310, the DBPSK modulator 320, the phase offset processor 325, the carrier allocator 330, the IFFT processor 340 and the preamble generator 350 in the transmitter of FIG. 3 according to prior art, a detailed description thereof will be omitted.

The scrambler 635, according to an exemplary embodiment of the present invention, can prevent a Complementary Set of Sequence (CSS) generated by the MSS processor 610 from increasing in a PAPR by the DBPSK modulator 620 and the phase offset processor 630. In other words, in an exemplary implementation, the scrambler 635 generates a new sequence by multiplying a modulated sequence output from the phase offset processor 630 by a scrambling sequence. The scrambler 635 can operate with any arbitrary sequence when an operation of changing the signal from the MSS processor 610 to an arbitrary form is performed.

An output MSS_SCR of the scrambler 635 is expressed as Equation (4).

$$MSS\_SCR = SCR(MSS) \quad (4)$$

In Equation (4), the term "SCR" denotes a scrambling operation of the scrambler 635. A new sequence is generated by multiplying the modulated sequence input to the scrambler 635 by a scrambling sequence. For example, when a length-K BSPK sequence is input as a modulated sequence, i.e. when $\{1_0, -1_1, -1_2, 1_3, \ldots, 1_{K-1}\}$ is input as a modulated sequence, even the scrambling sequence can be generated with a length-K arbitrary BPSK sequence. When a scrambling sequence is $\{-1_0, 1_1, -1_2, -1_3, \ldots, -1_{K-1}\}$, the scrambler 635 generates $\{-1_0, -1_1, 1_2, -1_3, \ldots, -1_{K-1}\}$ as a new length-K BPSK sequence by multiplying the modulated sequence of $\{1_0, -1_1, -1_2, 1_3, \ldots, 1_{K-1}\}$ by the scrambling sequence of $\{-1_0, 1_1, -1_2, -1_3, \ldots, 1_{K-1}\}$. That is, the scrambler 635 generates a new sequence MSS_SCR by multiplying the sequence modulated using Equation (4) by the scrambling sequence.

The scrambler 635 performs scrambling by multiplying the sequence modulated in the DBPSK modulator 620 and the phase offset processor 630, i.e. a length—384 modulated sequence expressed in 1 or −1, by a length—384 scrambling sequence used in the scrambler 635. The scrambling sequence will be described in more detail in the following exemplary embodiment.

The scrambler 635 generates a scrambling sequence for reducing a PAPR of a preamble P1. In a DVB system, a Pseudo Random Binary Sequence (PRBS) defined as Equation (5) is used, and the scrambler 635 can generate a scrambling sequence using the existing PRBS.

$$1 + X_{14} + X_{15} \quad (5)$$

Figure 7:
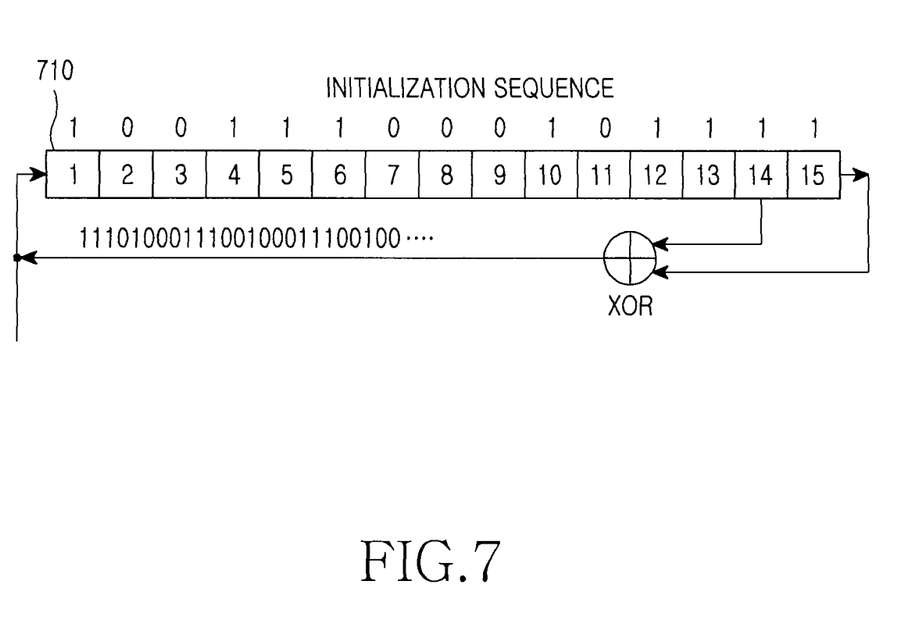
FIG. 7 is a diagram illustrating an example of a PRBS encoder for Equation (5)

FIG. 7 is a diagram illustrating an example of a PRBS encoder for Equation (5).

Referring to FIG. 7, a PRBS register 710 receives an initial value sequence (100010111100101), and generates a PRBS sequence (111010001110010001110010 . . . ). The initial value and the length—384 PAPR scrambling sequence are shown in Table 4.

The scrambling sequence of Table 4 is used as a scrambling sequence for a scrambler used for reducing a PAPR of a preamble P1. In the PRBS encoder of FIG. 7, a length—384 sequence generated with the initial value of Table 4 is converted from a value of 0 or 1 to a value of 1 or −1, and multiplied by a modulated sequence output from a phase offset processor in the scrambler 635, thereby reducing a PAPR.

Table 5 shows the PAPRs of 128 preambles P1 in an exemplary embodiment of the present invention which uses scrambling for PAPR reduction. It can be noted that the maximum PAPR is 9.10 dB, the minimum PAPR is 6.71 dB, and an average PAPR is 8.01 dB. Compared with Table 3, a gain of 1.4 dB can be obtained at the maximum PAPR.

TABLE 5

| S1 | S2 | PAPR |
|----|----|------|
| 0 | 0 | 7.42 |
| 0 | 1 | 7.23 |
| 0 | 2 | 7.71 |
| 0 | 3 | 7.16 |
| 0 | 4 | 8.00 |
| 0 | 5 | 8.16 |
| 0 | 6 | 7.87 |
| 0 | 7 | 7.81 |
| 0 | 8 | 8.30 |
| 0 | 9 | 8.20 |
| 0 | 10 | 8.11 |
| 0 | 11 | 8.12 |
| 0 | 12 | 8.91 |
| 0 | 13 | 8.43 |
| 0 | 14 | 7.88 |
| 0 | 15 | 7.46 |
| 1 | 0 | 7.18 |
| 1 | 1 | 8.31 |
| 1 | 2 | 7.76 |
| 1 | 3 | 7.99 |
| 1 | 4 | 8.78 |
| 1 | 5 | 7.82 |
| 1 | 6 | 7.78 |
| 1 | 7 | 7.15 |
| 1 | 8 | 7.96 |
| 1 | 9 | 8.14 |
| 1 | 10 | 7.76 |
| 1 | 11 | 7.80 |
| 1 | 12 | 7.19 |
| 1 | 13 | 8.84 |

TABLE 4

Initial value sequence

| 1 | 0 | 0 | 0 | 1 | 0 | 1 | 1 | 1 | 1 | 0 | 0 | 1 | 0 | 1 |
|---|---|---|---|---|---|---|---|---|---|---|---|---|---|---|

PRBS (Scrambling sequence)

| 1 | 1 | 1 | 0 | 1 | 0 | 0 | 0 | 1 | 1 | 1 | 0 | 0 | 1 | 0 | 0 | 0 | 1 | 1 | 1 | 0 | 0 | 1 | 0 | 0 | 1 | 0 | 1 | 1 | 0 | 0 | 1 |
|---|---|---|---|---|---|---|---|---|---|---|---|---|---|---|---|---|---|---|---|---|---|---|---|---|---|---|---|---|---|---|---|
| 0 | 0 | 0 | 1 | 0 | 1 | 1 | 0 | 1 | 1 | 1 | 0 | 1 | 0 | 1 | 1 | 0 | 1 | 1 | 0 | 1 | 1 | 0 | 0 | 1 | 1 | 1 | 1 | 0 | 1 | 1 | 0 |
| 0 | 1 | 1 | 0 | 1 | 0 | 1 | 0 | 0 | 0 | 1 | 0 | 1 | 0 | 1 | 0 | 1 | 1 | 1 | 1 | 1 | 0 | 0 | 1 | 0 | 1 | 1 | 1 | 1 | 1 | 1 | 1 |
| 0 | 0 | 0 | 0 | 1 | 0 | 1 | 1 | 1 | 0 | 0 | 0 | 0 | 0 | 1 | 0 | 0 | 0 | 1 | 1 | 1 | 0 | 0 | 1 | 0 | 0 | 0 | 0 | 1 | 1 | 0 | 0 |
| 1 | 0 | 0 | 1 | 0 | 1 | 1 | 0 | 0 | 1 | 0 | 1 | 0 | 1 | 1 | 0 | 1 | 1 | 1 | 0 | 1 | 0 | 0 | 1 | 1 | 1 | 1 | 1 | 0 | 1 | 1 | 1 |
| 0 | 0 | 1 | 1 | 1 | 0 | 1 | 0 | 0 | 0 | 0 | 1 | 1 | 0 | 1 | 0 | 1 | 0 | 0 | 1 | 1 | 0 | 0 | 0 | 0 | 1 | 0 | 1 | 1 | 1 | 1 | 1 |
| 0 | 1 | 0 | 0 | 1 | 0 | 0 | 1 | 1 | 1 | 0 | 0 | 0 | 0 | 1 | 1 | 1 | 0 | 1 | 1 | 0 | 1 | 0 | 0 | 1 | 0 | 0 | 0 | 1 | 0 | 0 | 1 |
| 1 | 0 | 1 | 1 | 1 | 0 | 1 | 1 | 0 | 0 | 1 | 1 | 0 | 1 | 0 | 1 | 1 | 0 | 0 | 1 | 1 | 0 | 1 | 0 | 1 | 0 | 1 | 1 | 1 | 1 | 0 | 1 |
| 0 | 1 | 0 | 1 | 1 | 1 | 1 | 1 | 1 | 0 | 0 | 0 | 1 | 1 | 1 | 1 | 1 | 1 | 0 | 0 | 0 | 0 | 0 | 1 | 0 | 0 | 1 | 0 | 0 | 0 | 0 | 0 |
| 1 | 0 | 0 | 0 | 0 | 1 | 1 | 0 | 1 | 0 | 1 | 0 | 0 | 0 | 1 | 1 | 0 | 0 | 0 | 1 | 0 | 1 | 1 | 0 | 1 | 0 | 0 | 0 | 1 | 0 | 1 | 0 |
| 0 | 1 | 1 | 1 | 0 | 1 | 1 | 1 | 0 | 0 | 1 | 1 | 1 | 1 | 0 | 1 | 0 | 0 | 1 | 1 | 0 | 0 | 1 | 0 | 1 | 0 | 0 | 0 | 1 | 1 | 1 | 0 |
| 1 | 0 | 1 | 0 | 1 | 1 | 1 | 1 | 0 | 0 | 1 | 0 | 0 | 1 | 1 | 1 | 1 | 1 | 1 | 0 | 0 | 0 | 1 | 0 | 1 | 1 | 0 | 1 | 0 | 0 | 0 | 0 |

TABLE 5-continued

| S1 | S2 | PAPR |
|---|---|---|
| 1 | 14 | 8.78 |
| 1 | 15 | 7.43 |
| 2 | 0 | 8.21 |
| 2 | 1 | 8.05 |
| 2 | 2 | 7.67 |
| 2 | 3 | 8.25 |
| 2 | 4 | 8.86 |
| 2 | 5 | 7.39 |
| 2 | 6 | 7.04 |
| 2 | 7 | 8.08 |
| 2 | 8 | 8.18 |
| 2 | 9 | 7.55 |
| 2 | 10 | 8.20 |
| 2 | 11 | 7.82 |
| 2 | 12 | 7.64 |
| 2 | 13 | 8.55 |
| 2 | 14 | 8.05 |
| 2 | 15 | 8.09 |
| 3 | 0 | 8.32 |
| 3 | 1 | 8.09 |
| 3 | 2 | 7.38 |
| 3 | 3 | 8.02 |
| 3 | 4 | 8.13 |
| 3 | 5 | 7.21 |
| 3 | 6 | 8.04 |
| 3 | 7 | 7.99 |
| 3 | 8 | 7.55 |
| 3 | 9 | 8.97 |
| 3 | 10 | 8.37 |
| 3 | 11 | 7.35 |
| 3 | 12 | 8.13 |
| 3 | 13 | 7.62 |
| 3 | 14 | 7.93 |
| 3 | 15 | 7.37 |
| 4 | 0 | 6.71 |
| 4 | 1 | 8.51 |
| 4 | 2 | 7.39 |
| 4 | 3 | 7.96 |
| 4 | 4 | 7.66 |
| 4 | 5 | 8.43 |
| 4 | 6 | 8.48 |
| 4 | 7 | 8.70 |
| 4 | 8 | 8.01 |
| 4 | 9 | 8.04 |
| 4 | 10 | 7.78 |
| 4 | 11 | 7.74 |
| 4 | 12 | 9.10 |
| 4 | 13 | 8.46 |
| 4 | 14 | 7.47 |
| 4 | 15 | 9.08 |
| 5 | 0 | 7.13 |
| 5 | 1 | 7.55 |
| 5 | 2 | 9.01 |
| 5 | 3 | 8.25 |
| 5 | 4 | 7.90 |
| 5 | 5 | 8.64 |
| 5 | 6 | 8.92 |
| 5 | 7 | 8.34 |
| 5 | 8 | 7.91 |
| 5 | 9 | 7.02 |
| 5 | 10 | 8.33 |
| 5 | 11 | 7.84 |
| 5 | 12 | 6.80 |
| 5 | 13 | 7.42 |
| 5 | 14 | 9.09 |
| 5 | 15 | 7.01 |
| 7 | 0 | 7.67 |
| 7 | 1 | 7.45 |
| 7 | 2 | 8.50 |
| 7 | 3 | 8.57 |
| 7 | 4 | 8.74 |
| 7 | 5 | 8.06 |
| 7 | 6 | 7.84 |
| 7 | 7 | 8.11 |
| 7 | 8 | 8.74 |
| 7 | 9 | 8.10 |
| 7 | 10 | 7.12 |
| 7 | 11 | 7.10 |
| 7 | 12 | 7.66 |
| 7 | 13 | 8.14 |
| 7 | 14 | 8.47 |
| 7 | 15 | 7.89 |
| 8 | 0 | 7.22 |
| 8 | 1 | 8.34 |
| 8 | 2 | 7.78 |
| 8 | 3 | 8.07 |
| 8 | 4 | 6.99 |
| 8 | 5 | 8.90 |
| 8 | 6 | 8.48 |
| 8 | 7 | 8.16 |
| 8 | 8 | 7.74 |
| 8 | 9 | 8.43 |
| 8 | 10 | 8.88 |
| 8 | 11 | 8.16 |
| 8 | 12 | 8.29 |
| 8 | 13 | 7.49 |
| 8 | 14 | 7.57 |
| 8 | 15 | 8.03 |

In an exemplary implementation, a new sequence is generated by the above-stated scrambler 635. Moreover, each scrambling sequence can be stored in a look-up table for future use, or can be determined when necessary. As an example, the output of the DBPSK modulator 620 in FIG. 6 can be stored in the look-up table, the output of the scrambler 635 can be stored in the look-up table, or the outputs of all the blocks 600 to 635 can be stored in the look-up table for an operation of the scrambler 635.

Figure 8:
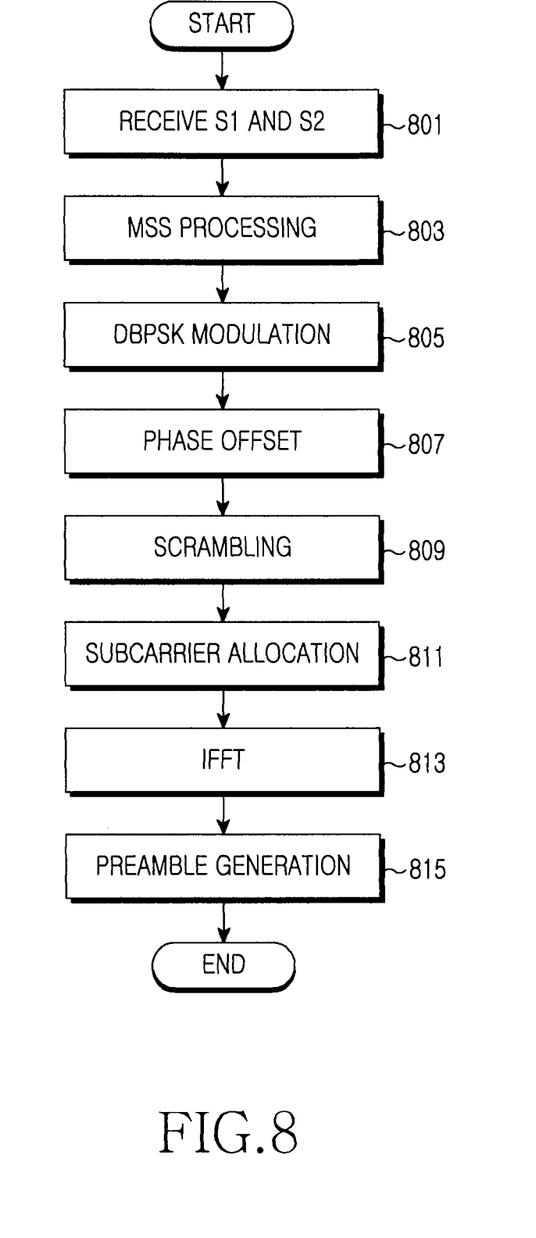
FIG. 8 is a flowchart illustrating a transmission method for transmitting a preamble in a DVB system according to an exemplary embodiment of the present invention.

FIG. 8 is a flowchart illustrating a transmission method for transmitting a preamble in a DVB system according to an exemplary embodiment of the present invention.

Referring to FIG. 8, the transmitter receives S1 and S2 in step 801, and generates an MSS by selecting a sequence corresponding to the S1 and S2 in step 803. The transmitter differentially modulates the MSS in step 805, and applies 180° phase offset to the 64 MSB bits in step 807. In step 809, the transmitter performs scrambling by multiplying the scrambling sequence generated by Equation (5) by the sequence modulated in step 807. In step 811, the transmitter receives the scrambled sequence through each allocated subcarrier. Next, in step 813, the transmitter generates a time-domain signal by performing IFFT on the scrambled sequence received through the allocated subcarrier. Finally, in step 815, the transmitter generates a preamble having a structure illustrated in FIG. 1.

As the scrambling operation performed by the scrambler 635 is carried out after DBPSK modulation, exemplary embodiments of the present invention are more stable in the detection performance of S1 and S2, as compared with when the scrambling operation is performed before the DBPSK modulation. In other words, exemplary embodiments of present invention are robust in detection performance of S1 and S2.

Figure 9:
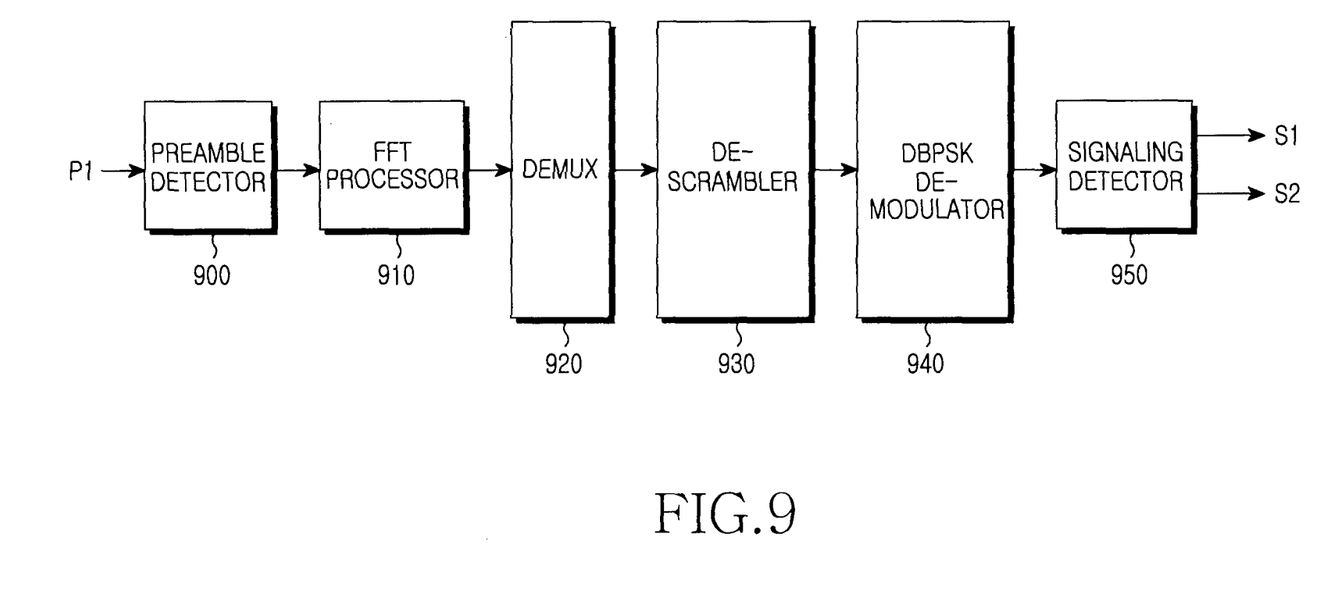
FIG. 9 is a block diagram illustrating a receiver for receiving a preamble in a DVB system according to an exemplary embodiment of the present invention.

FIG. 9 is a block diagram illustrating a receiver for receiving a preamble in a DVB system according to an exemplary embodiment of the present invention.

Referring to FIG. 9, the receiver includes a preamble detector 900, an FFT processor 910, a DEMUX 920, a descrambler 930, a DBPSK demodulator 940, and a signaling detector 950. Since the preamble detector 900, the FFT processor 910, the DEMUX 920, the DBPSK demodulator 940 and the signaling detector 950 are substantially the same in operation as the preamble detector 400, the FFT processor 410, the DEMUX 420, the DBPSK demodulator 430 and the signaling detector 440 illustrated in FIG. 4, a detailed description thereof will be omitted.

The descrambler 930, according to an exemplary embodiment of the present invention, performs a reverse process of the scrambler 635 on the sequence obtained by demultiplexing data on active carriers through which a preamble is transmitted. That is to say, the descrambler 930 performs descrambling by multiplying the demultiplexed sequence by the descrambling sequence. The descrambling sequence has the same length as that of the demultiplexed sequence. The descrambling sequence can be previously determined and stored in a look-up table, or can be generated using PRBS, in substantially the same way as for the above-stated scrambling sequence.

Figure 10:
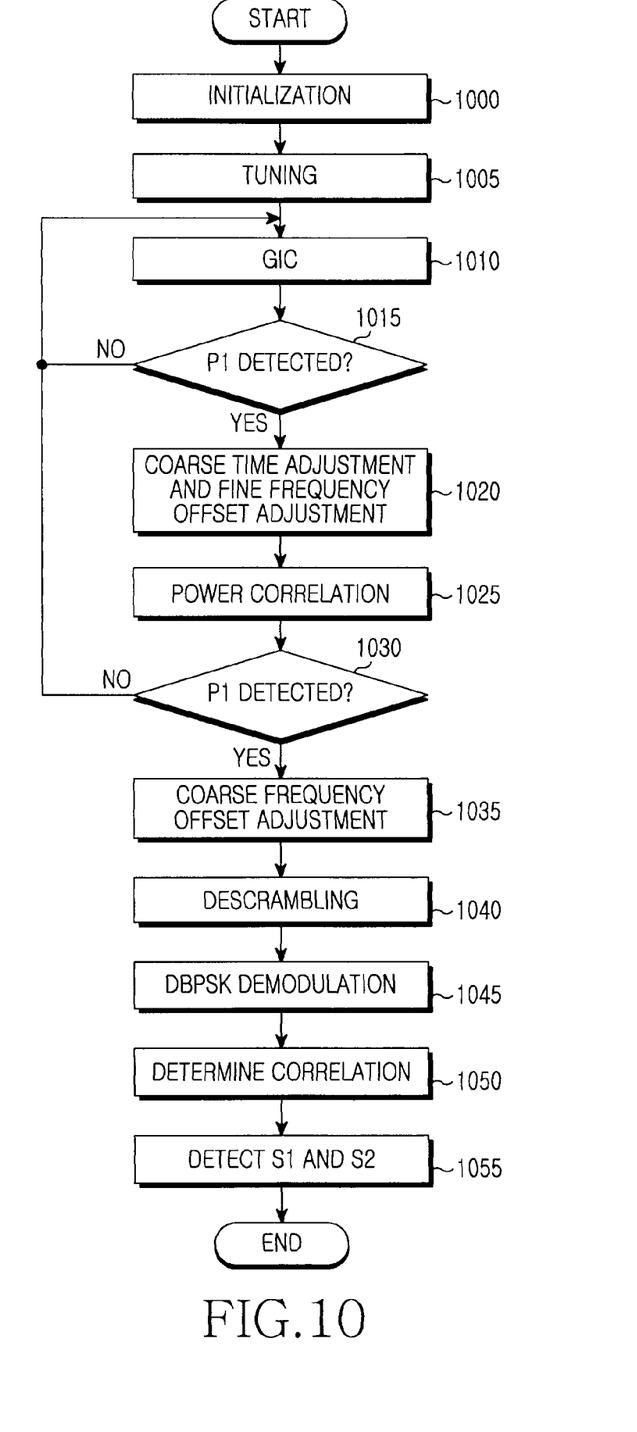
FIG. 10 is a flowchart illustrating a reception method for receiving a preamble in a DVB system according to an exemplary embodiment of the present invention.

FIG. 10 is a flowchart illustrating a reception method for receiving a preamble in a DVB system according to an exemplary embodiment of the present invention.

Referring to FIG. 10, the receiver performs initialization in step 1000, and performs tuning on a preamble in step 1005. The receiver performs Guard Interval-Correlation (GIC) on the received signal in step 1010, and determines in step 1015 whether it has detected a preamble P1. When the receiver has failed to detect the preamble P1 in step 1015, the receiver returns to step 1010. However, when the receiver has detected the preamble P1, the receiver performs coarse time adjustment and fine frequency offset adjustment in step 1020. Thereafter, the receiver performs power correlation to estimate power of active carriers in step 1025, and then determines again in step 1030 whether it has detected the preamble P1. When the receiver has failed to detect the preamble P1 in step 1030, the receiver returns back to step 1010, and when receiver has successfully received the preamble P1, the receiver performs coarse frequency offset adjustment in step 1035. Next, the receiver performs descrambling using a descrambling sequence according to an exemplary embodiment of the present invention in step 1040, and performs differential demodulation, which is a reverse process of the differential modulation scheme at the transmitter, in step 1045. Thereafter, the receiver determines a correlation between preambles in step 1050, and detects signals of S1 and S2 in step 1055.

As is apparent from the foregoing description, exemplary embodiments of the present invention use the differential modulation scheme in transmitting a preamble, one of physical channels, in the DVB system, thus reducing a PAPR of the preamble P1 by solving the PAPR increase problem using scrambling.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for receiving a preamble in a Digital Video Broadcasting (DVB) system, the apparatus comprising:
a first processor configured to detect a preamble from a received signal, to convert the detected preamble into a frequency-domain signal, and to demultiplex the frequency-domain signal;
a descrambler configured to descramble the demultiplexed sequence by multiplying the demultiplexed sequence by a descrambling sequence stored in a look-up table for directly reducing a peak-to-average power ratio (PAPR) of the detected preamble; and
a second processor configured to differentially demodulate the descrambled sequence and to detect a plurality of sequences from the demodulated sequence,
wherein the first processor is further configured to:
determine whether a first preamble is detected,
perform, in response to detection of the first preamble, a coarse time adjustment and a fine frequency offset adjustment on the received signal, and a power correlation to estimate power of active carriers of the received signal,
determine whether the first preamble is detected after the coarse time adjustment and fine frequency offset on the received signal are performed, and
perform, in response to detection of the first preamble, a coarse frequency offset adjustment, and
wherein the descrambler is further configured to descramble the demultiplexed sequence after the coarse time adjustment, the fine frequency offset adjustment, the power correlation, and the coarse frequency offset adjustment are performed on the received signal.

2. The apparatus of claim 1, wherein the first processor comprises:
a preamble detector configured to detect the preamble from a received signal;
a Fast Fourier Transform (FFT) processor configured to convert the preamble into the frequency-domain signal; and
a demultiplexer configured to demultiplex data on an active carrier through which the preamble is transmitted.

3. The apparatus of claim 1, wherein the second processor comprises:
a differential demodulator configured to differentially demodulate the descrambled sequence; and
a signaling detector configured to detect the plurality of sequences from the demodulated sequence.

4. The apparatus of claim 1, wherein the demultiplexed sequence and the descrambling sequence have the same length.

5. The apparatus of claim 1, wherein the descrambling sequence is generated using a Pseudo Random Binary Sequence (PRBS).

6. The apparatus of claim 1, wherein the differential demodulation comprises a Differential Binary Phase Shift Keying (DBPSK) demodulation.

7. A method for receiving a preamble in a Digital Video Broadcasting (DVB) system, the method comprising:
storing a descrambling sequence for directly reducing a peak-to-average power ratio (PAPR) of a preamble in a look-up table;
detecting the preamble from a received signal;
converting the detected preamble into a frequency-domain signal;
demultiplexing the frequency-domain signal;
descrambling the demultiplexed sequence by multiplying the demultiplexed sequence by the descrambling sequence;
differentially demodulating the descrambled sequence;
detecting a plurality of sequences from the demodulated sequence;
determining whether a first preamble is detected;
in response to detection of the first preamble, performing a coarse time adjustment and a fine frequency offset adjustment on the received signal, and performing a power correlation to estimate power of active carriers of the received signal;

determining whether the first preamble is detected after performing the coarse time adjustment and fine frequency offset on the received signal; and in response to detection of the first preamble after performing the coarse time adjustment and fine frequency offset on the received signal, performing a coarse frequency offset adjustment, wherein the descrambling is performed after the coarse time adjustment, the fine frequency offset adjustment, the power correlation, and the coarse frequency offset adjustment.

8. The method of claim 7, wherein the demultiplexing of the frequency-domain signal comprises demultiplexing data on an active carrier through which the preamble is transmitted.

9. The method of claim 7, wherein the demultiplexed sequence and the descrambling sequence have the same length.

10. The method of claim 7, further comprising generating the descrambling sequence using a Pseudo Random Binary Sequence (PRBS).

11. The method of claim 7, wherein the differentially demodulating of the descrambled sequence comprises using a Differential Binary Phase Shift Keying (DBPSK) demodulation.

* * * * *